Sept. 4, 1962        J. A. NIETO, JR        3,052,342
ATTACHMENT FOR HAY BALER
Filed Oct. 19, 1959                               2 Sheets-Sheet 1
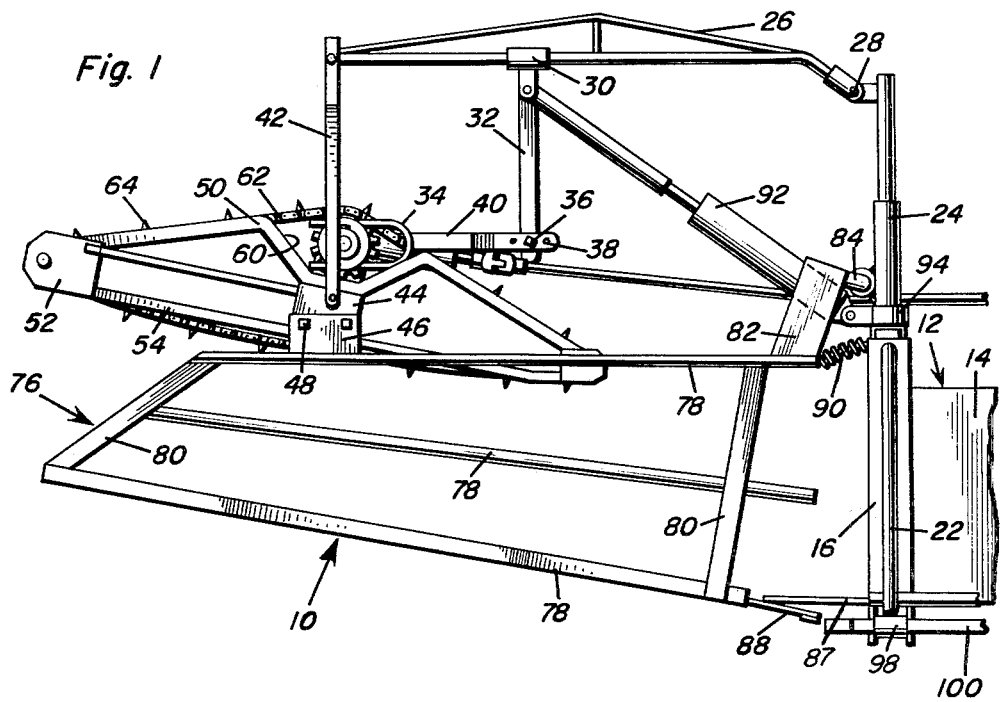
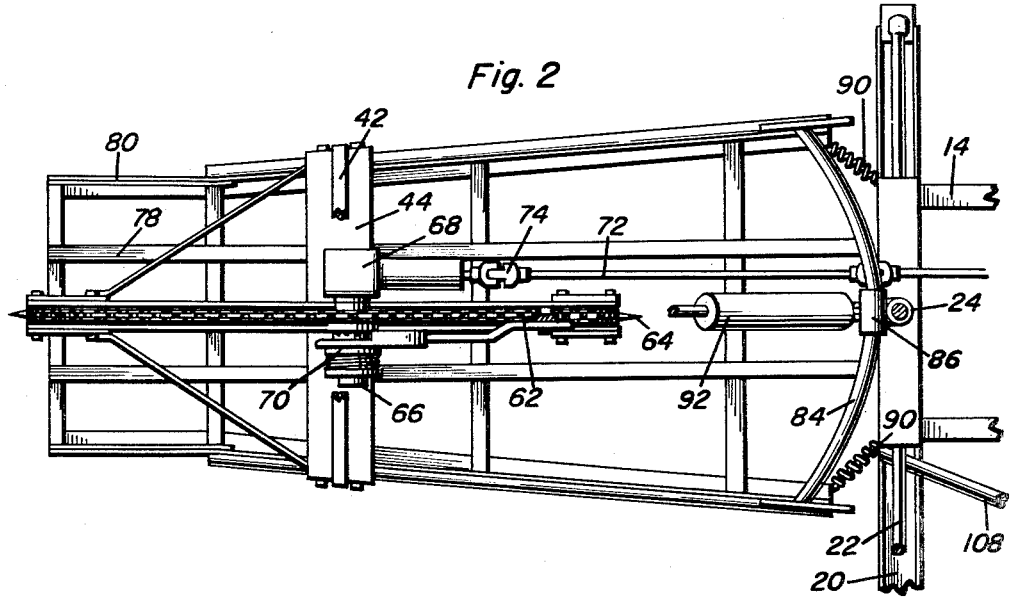
Joe A. Nieto, Jr.
INVENTOR.

Sept. 4, 1962                J. A. NIETO, JR                3,052,342
                         ATTACHMENT FOR HAY BALER
Filed Oct. 19, 1959                                    2 Sheets-Sheet 2
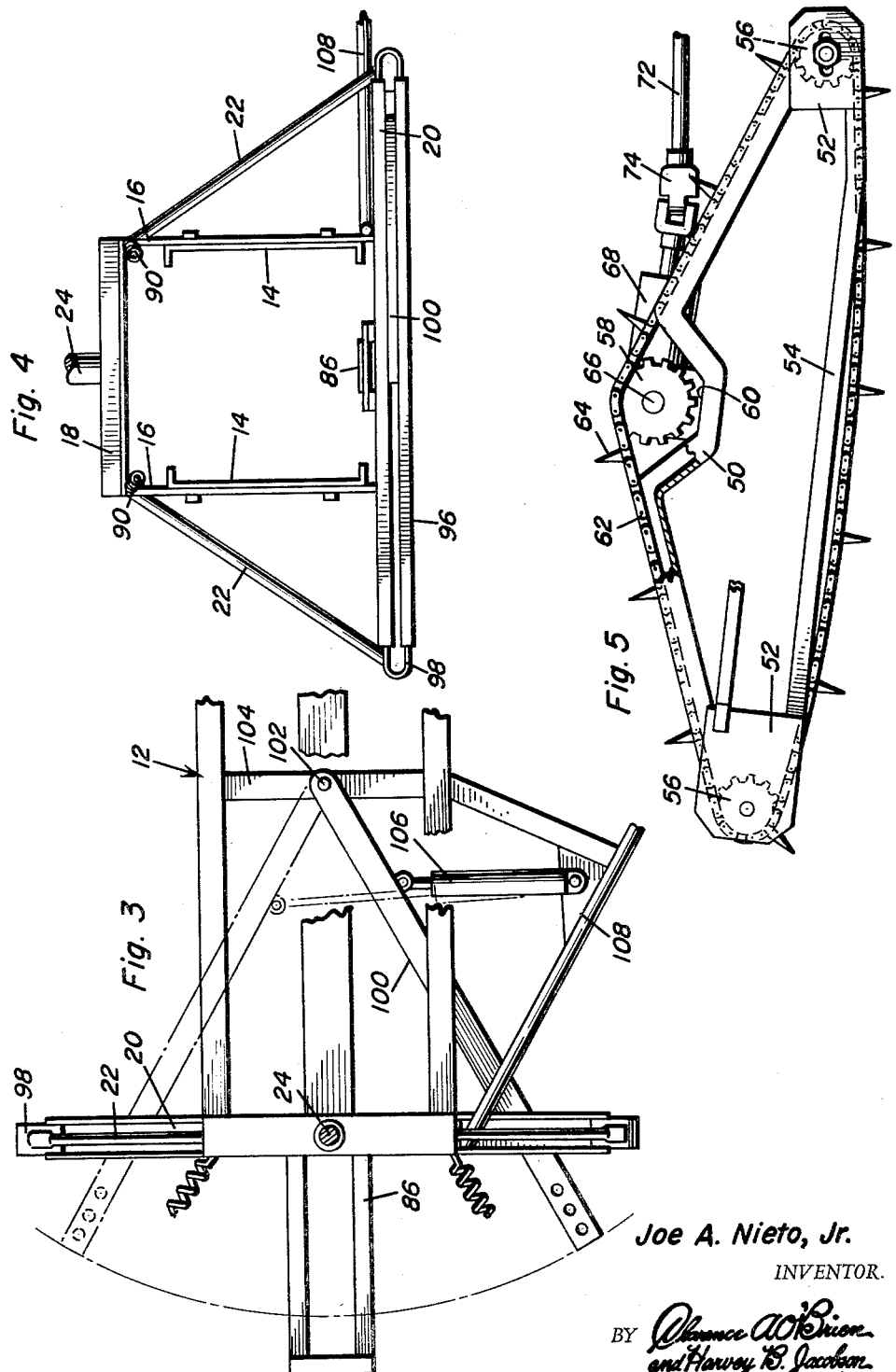
Joe A. Nieto, Jr.
INVENTOR.

United States Patent Office 3,052,342
Patented Sept. 4, 1962

3,052,342
ATTACHMENT FOR HAY BALER
Joe A. Nieto, Jr., Rte. 2, Box 49, Roswell, N. Mex.
Filed Oct. 19, 1959, Ser. No. 847,187
6 Claims. (Cl. 198—122)

The present invention generally relates to a hay bale handling device and more particularly to an attachment for hay balers for receiving the bales of hay therefrom and transporting the bales of hay onto an attached trailer.

In present day practice, it is usual for a pickup baler to pick up the cured hay directly from a windrow and compress the hay into bales and discharge the bales back onto the ground surface at spaced intervals. This requires a second picking up operation which is either done by hand or by various machines for picking up bales of hay and depositing them on vehicles such as trucks, wagons or the like. In view of the scattered condition of the bales of hay when discharged from the baler, it is a time consuming job in loading the bales of hay onto a load carrying vehicle. Therefore, it is the primary object of the present invention to provide an attachment for hay balers which will gather a plurality of hay bales onto a trailer.

Another object of the present invention is to provide an attachment for hay balers which includes a mechanism for conveying the bales of hay rearwardly and guiding them onto a trailer.

A further important object of the present invention is to provide an attachment for a hay baler which may be swung in a vertical plane and also in a horizontal plane for discharging the bales of hay onto the trailer in vertical rows disposed in laterally spaced relation thereby completely filling the trailer so that a predetermined number of bales of hay will be discharged by the trailer.

Yet another feature of the present invention is to provide an attachment for hay balers which is simple in construction, easy to operate, easy to attach, efficient in handling baled hay and generally inexpensive to manufacture and maintain.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of a portion of the attachment illustrating the manner in which the device is assembled onto a baler;

FIGURE 2 is a plan view of the construction of FIGURE 1 with a portion of the upper framework structure being broken away for clarity;

FIGURE 3 is a plan view with portions broken away illustrating the tongue attachment and means for adjusting the tongue;

FIGURE 4 is an end elevational view of the discharge end of the baler and illustrating the construction of FIGURE 3; and FIGURE 5 is a detailed elevational view of the mechanism for propelling the bales of hay with portions broken away.

Referring now specifically to the drawings, the numeral 10 generally designates that portion of the attachment of the present invention which is attached directly to a hay baler generally designated by the numeral 12 which includes the usual delivery chute or compression chamber 14 which may be of any conventional construction for discharging a bale of hay in a compressed form. Attached to the compression chamber 14 is a pair of uprights 16 interconnected by a transverse frame member 18 and an elongated bottom member 20 having the ends thereof braced by inclined brace members 22 extending upwardly and connected to the top edges of the side members 16. Extending upwardly from the transverse member 18 is a vertical post 24 having extending therefrom an arm 26 generally in the form of a truss which is attached to the upper end of the vertically adjustable post by virtue of a pivot pin 28. Slidably disposed on the lower beam of the truss 26 is a sleeve 30 having a depending member 32 connected thereto, the depending member 32 being adjustably connected to a clutch operating yoke 34 by virtue of a removable bolt 36 passing selectively through apertures 38 in the yoke arm 40. The outer end of the truss 26 supports a pair of depending and diverging straps 42 that connect to opposite ends of a transverse support plate 44 which ends have supporting members 46 attached thereto by bolts 48. The transverse support plate 44 supports a longitudinally extending frame member 50 which is provided with plate members 52 at each end thereof, a lower frame member 54 also interconnecting the plate members 52 thereby providing a generally rigid triangular construction. Each of the plate members 52 is provided with a sprocket gear 56 therebetween which sprocket gears 56 are in alignment with a sprocket gear 58 disposed in a recess 60 in the top frame member 50. An endless sprocket chain 62 encircles the sprocket gears and the chain 62 is provided with a plurality of longitudinally spaced projecting points or barbs 64 which act to engage a bale of hay on the lower run of the chain which is below the transverse plate 44 and which extends below the lower frame member 54.

The sprocket gear 58 is driven from the power output shaft 66 of a gear box 68 and is selectively connected to the shaft 66 by a clutch gear 70 selectively rendered engageable with the sprocket gear 58 by virtue of the yoke 34 which will disengage the clutch member 70 when moved inwardly and permit engagement of the clutch member 70 and the sprocket gear 58 when retracted thereby providing for driving of the sprocket chain 62. The gear box 68 is provided with an input from a power take-off shaft 72 having the necessary universal connections 74. The power take-off 72 is driven from a suitable source on the hay baler.

Supported below the conveying chain 62 is a chute generally designated by the numeral 76 which includes a plurality of longitudinal members 78 and vertical framing members 80. The upper longitudinal members 78 are connected to the supporting brackets 46 while the front ends thereof are connected to and supported by a pair of upstanding brackets 82 having an elongated arcuate rod 84 extending therebetween, the arcuate rod being slidably received within a sleeve 86 attached to the vertical post 24. The hay baler compressor 14 is provided with an extension member 87 which overlies a forward extension 88 projecting from the bottom rails 78 of the chute 76 for providing somewhat of a continuous path for the bales of hay. For centering the chute 76, a pair of springs 90 are provided which extend between the outer corners of the upper ends of the chute and the adjacent edges of the upright framing members 16.

A piston and cylinder arrangement 92 extends between the sleeve 30 and a collar 94 secured to the upstanding post 24 and by expansion and contraction of the piston and cylinder arrangement 92, the clutch 70 may be engaged or disengaged for causing driving movement of the chain 62 or permitting the chain to be idle.

Supported below the lower transverse member 20 is a second lower transverse member 96 interconnected with the ends of the upper transverse member 20 by U-shaped end pieces 98. Slidingly disposed between the members 20 and 96 is a trailer drawbar 100 pivotally supported by a pivot pin 102 from a transverse member 104 under the compressing chamber 14. Connected to the drawbar 100 is a hydraulic piston and cylinder arrangement 106 which connects the drawbar 100 and framing elements 108 for moving the drawbar 100 swivelly back and forth between the limits provided by the U-shaped members 98.

When the bales are discharged from the compressor chamber 14 in the usual manner they are discharged into the chute 76. As the bales are discharged into the chute 76, they are picked up by the teeth or projections 64 on the conveyor chain 62 and are moved rearwardly to the discharge end of the chute 76. The discharge chute end is normally centralized by the springs 90 and the sliding engagement between the arcuate member 84 and the sleeve 86. The entire attachment may swivel about the center of the upstanding post 24 which has the sleeve mounted thereon for rotation. When the piston and cylinder arrangement 92 is expanded, the clutch operation will be affected in such a manner that the conveying chain will be declutched or disengaged from its driving force as the entire assembly is lifted due to lengthening of the diagonal formed by the piston and cylinder arrangement 92 thus elevating the discharge end of the chute 76 so that it may become elevated for discharging the bale of hay at an elevated position.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In a bale conveyor, the combination of a supporting frame defining a bale passage, an upright provided on said frame above said passage, an elongated bale chute having inlet and outlet ends and pivotally connected at its inlet end to said frame in alignment with said passage for raising and lowering movement of the chute, a vertically swingable arm pivoted at one end thereof to said upright and extending in spaced relation above said chute, hanger means suspending the outlet end portion of the chute from the other end of said arm, a fluid operator pivotally connected to said upright and to said arm for raising and lowering said chute, an endless bale driving chain assembly carried by said hanger means and disposed longitudinally at the top of the chute, and power means for driving said chain assembly.

2. The device as defined in claim 1 together with means responsive to raising of said chute to a predetermined extent by said fluid operator for interrupting operation of said driving means for said chain assembly.

3. The device as defined in claim 1 together with means connecting said chute and said arm to said upright for swinging movement thereof in a horizontal plane.

4. The device as defined in claim 1 together with means connecting said chute and said arm to said upright for swinging movement thereof in a horizontal plane, and oppositely acting resilient means interposed between said chute and said frame for urging the chute to a centralized position relative to the frame.

5. The device as defined in claim 1 together with a sleeve slidable on said arm during raising and lowering of said chute, said sleeve having said fluid operator connected thereto, and means responsive to sliding of said sleeve during raising of the chute to a predetermined extent for interrupting operation of said driving means for said chain assembly.

6. The device as defined in claim 5 wherein said chain assembly includes a chain driving sprocket, said power means including a driven shaft having said sprocket positioned thereon, and said drive interrupting means including a clutch for drivingly connecting and disconnecting said sprocket to and from said driven shaft, and linkage means connected to and actuated by said slidable sleeve for engaging and disengaging said clutch.

References Cited in the file of this patent

UNITED STATES PATENTS

| | | |
|---|---|---|
| 310,115 | Barnikel | Dec. 30, 1884 |
| 1,221,316 | Hagadone | Apr. 3, 1917 |
| 1,469,357 | Castleman | Oct. 2, 1923 |
| 1,662,832 | Nelson et al. | Mar. 20, 1928 |
| 2,390,306 | Hunziker | Dec. 4, 1945 |
| 2,408,862 | Lisota | Oct. 8, 1946 |
| 2,431,892 | Russell | Dec. 2, 1947 |
| 2,613,591 | Bruns et al. | Oct. 14, 1952 |
| 2,761,577 | Lahman | Sept. 4, 1956 |